US012208724B2

(12) United States Patent
Raghavan et al.

(10) Patent No.: US 12,208,724 B2
(45) Date of Patent: Jan. 28, 2025

(54) VEHICLE ADJUSTABLE AIR BAFFLE ASSEMBLY WITH LIGHTING DEVICE

(71) Applicant: Valeo Systemes Thermiques, Le Mesnil Saint Denis (FR)

(72) Inventors: Parthasarathy Raghavan, Chennai (IN); Shankar Duraisamy, Chennai (IN); Arunkumar Subramanian, Chennai (IN); Sebastien Velasco, Chennai (IN); Arulkumaran Mohan, Chennai (IN)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 0 days.

(21) Appl. No.: 18/396,188

(22) Filed: Dec. 26, 2023

(65) Prior Publication Data

US 2024/0208398 A1 Jun. 27, 2024

(30) Foreign Application Priority Data

Dec. 23, 2022 (FR) .................................... 2214371

(51) Int. Cl.
*B60K 11/08* (2006.01)
*B60Q 1/00* (2006.01)
*B60Q 1/28* (2006.01)

(52) U.S. Cl.
CPC .......... *B60Q 1/0017* (2013.01); *B60K 11/085* (2013.01); *B60Q 1/28* (2013.01)

(58) Field of Classification Search
CPC ...... B60Q 1/0017; B60Q 1/28; B60K 11/085; F24F 13/15; F24F 2013/1473; F24F 13/1413; F21V 29/73; F21V 33/0088
See application file for complete search history.

(56) References Cited

U.S. PATENT DOCUMENTS

| 1,501,933 | A | * | 7/1924 | Wilson | B60K 11/085 236/35.3 |
| 1,523,541 | A | * | 1/1925 | Frank | B60K 11/085 123/41.04 |
| 1,542,407 | A | * | 6/1925 | Raleigh | B60K 11/085 123/41.04 |
| 8,550,887 | B2 | * | 10/2013 | Walters | B60K 11/085 454/155 |
| 10,029,558 | B2 | * | 7/2018 | Frayer, III | B60K 11/085 |
| 10,071,625 | B1 | * | 9/2018 | Stoddard | B60K 11/085 |
| 2010/0071977 | A1 | * | 3/2010 | Ritz | B60K 11/085 180/68.1 |
| 2010/0243352 | A1 | * | 9/2010 | Watanabe | B60K 11/085 180/68.1 |
| 2011/0073395 | A1 | * | 3/2011 | Lee | B60K 11/085 180/68.1 |
| 2013/0068403 | A1 | * | 3/2013 | Fenchak | B60K 11/085 160/218 |

(Continued)

Primary Examiner — Ismael Negron
(74) Attorney, Agent, or Firm — Osha Bergman Watanabe & Burton LLP

(57) ABSTRACT

A baffle assembly includes a screen defining at least one air flow passage through the screen, a shut-off device having at least one flap configured to move between at least two positions to control circulation of the air flow through the passage, a lever controlling the positions of the flap, and at least one lighting device borne by the lever and distinct from the flap.

13 Claims, 5 Drawing Sheets

(56) References Cited

U.S. PATENT DOCUMENTS

| | | | | |
|---|---|---|---|---|
| 2013/0223980 A1* | 8/2013 | Pastrick | ............... | B60K 11/085 |
| | | | | 415/1 |
| 2014/0090610 A1* | 4/2014 | Higuchi | ............... | B60K 11/085 |
| | | | | 123/41.58 |
| 2014/0370795 A1* | 12/2014 | Klop | .................... | B60K 11/085 |
| | | | | 454/75 |

* cited by examiner

[Fig.1]
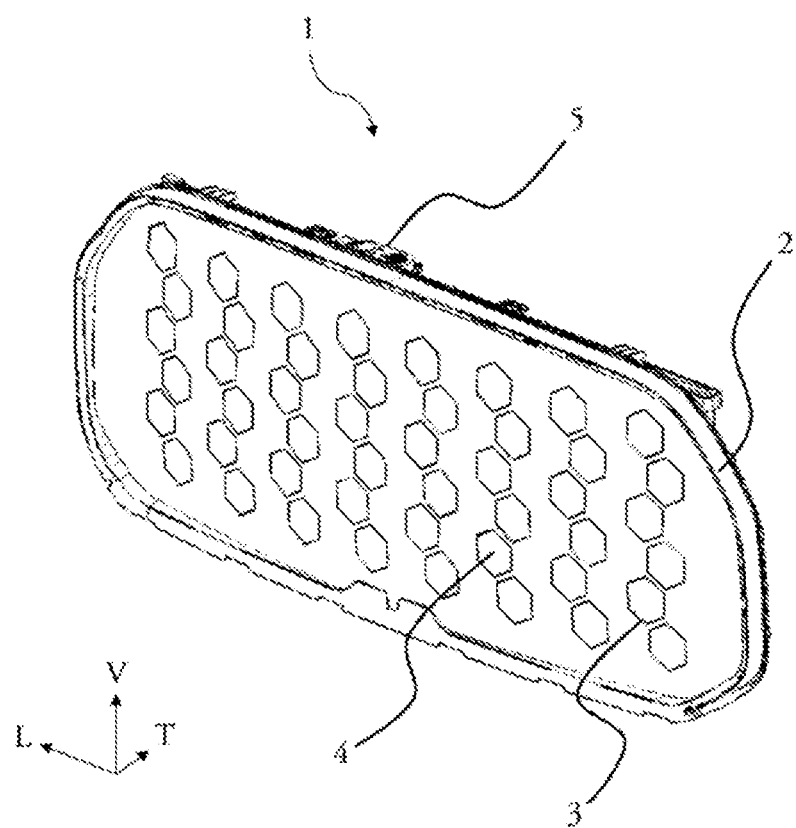

[Fig.2]
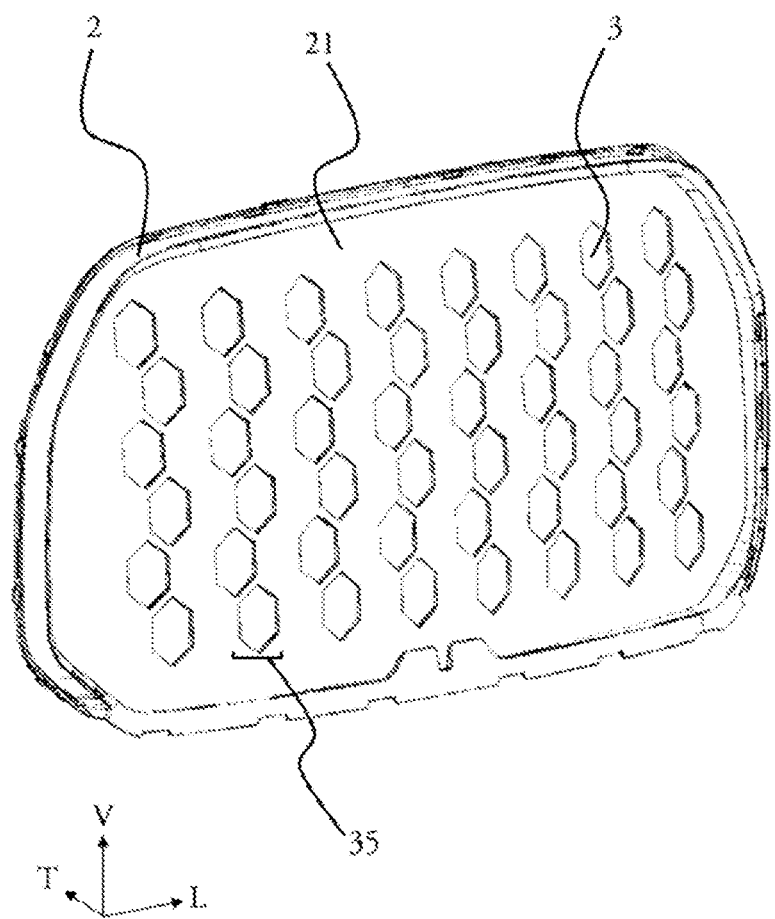

[Fig.3]
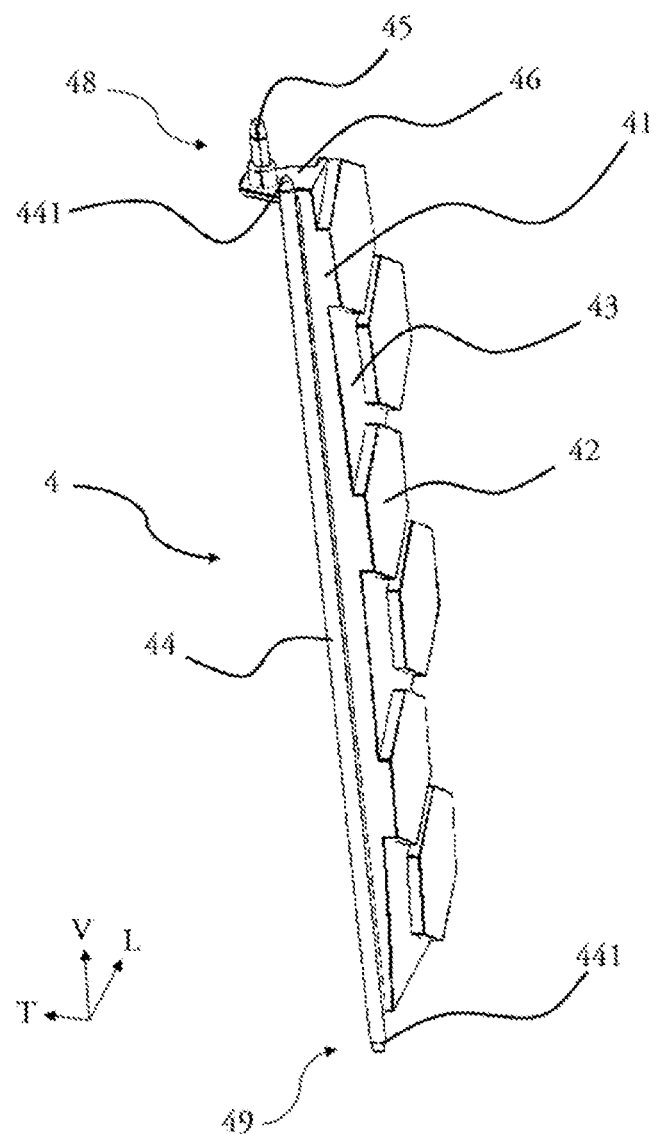

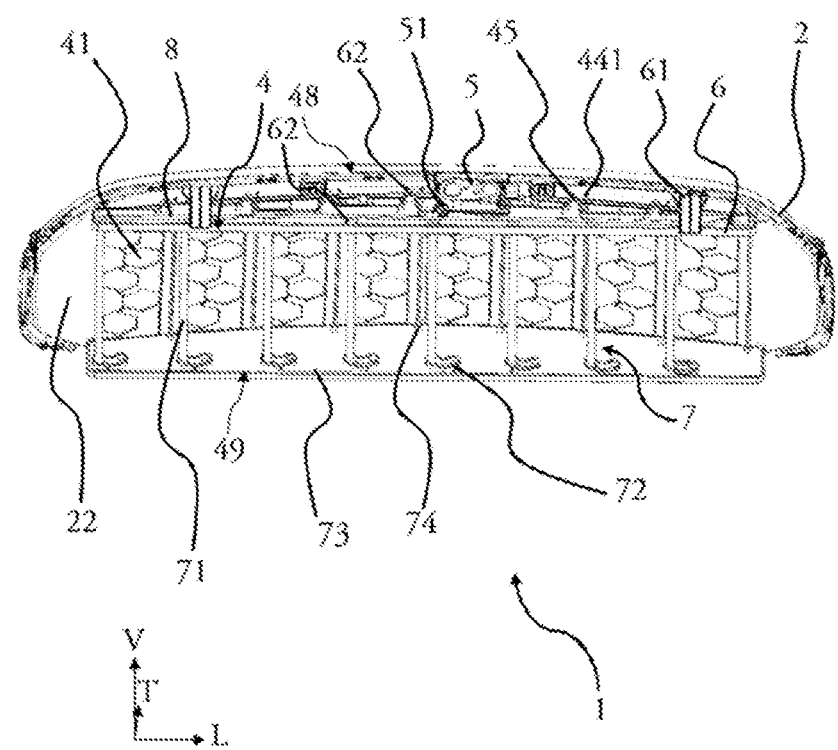
[Fig.4]

[Fig.5]
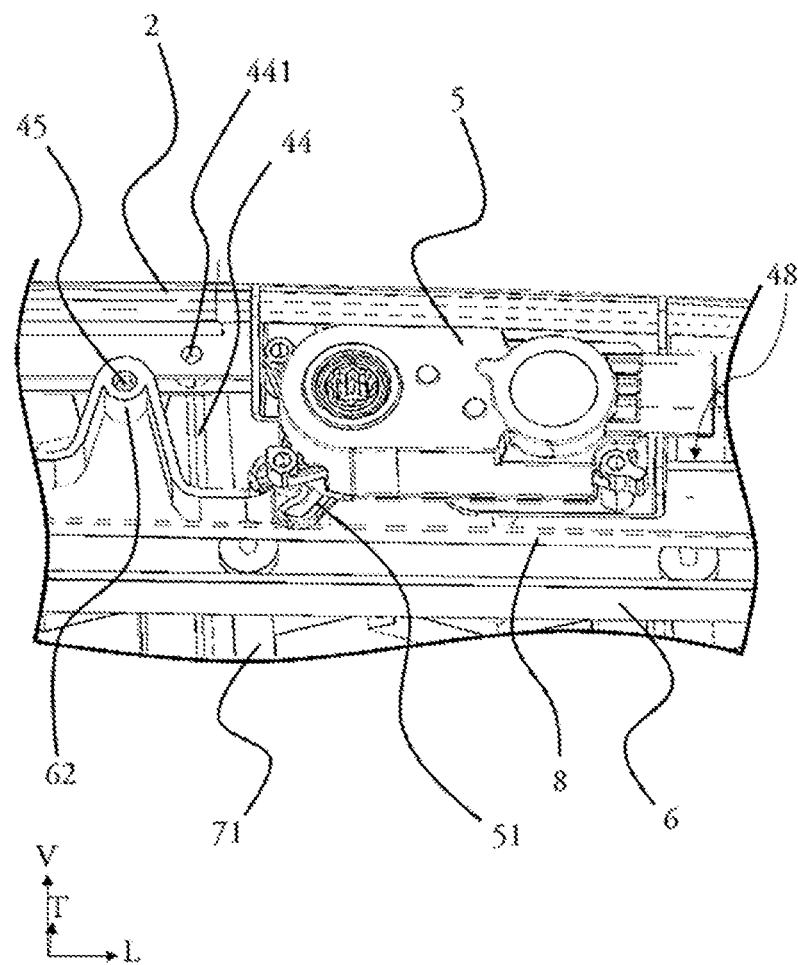

VEHICLE ADJUSTABLE AIR BAFFLE ASSEMBLY WITH LIGHTING DEVICE

The present invention relates to the field of thermal management devices, and more particularly a front face assembly of a vehicle intended to have an air flow passing through it and equipped with a lighting device.

Vehicles, notably motor vehicles, are commonly equipped with a front face assembly adapted to have an air flow passing through it. This air flow is used, for example, to perform heat exchange with a front face heat exchanger so as to operate an air-conditioning and/or cooling system or a radiator. Such front face assemblies may include systems for controlling this air flow, generally referred to as AGS, which stands for Active Grille Shutter. They make it possible in particular to increase the air penetration coefficient when the engine does not need to be cooled by an external air flow, which makes it possible to reduce fuel consumption and vehicle emissions.

These air flow control systems are generally composed of a screen in which passages are made to allow the air flow to pass through. The system further comprises a shut-off device composed, for example, of flaps controlled by a control unit so as to allow or prevent the passage of the air flow through the passages made in the screen, in particular to reduce the air penetration coefficient when the flaps prevent the passage of the air flow.

It is known practice to equip the shut-off devices with lighting devices which, when the flaps allow the air flow to pass through the passages made in the screen, allow a lighting function. However, existing front face assemblies equipped with lighting devices have a first drawback. To be specific, to associate a lighting device with a front face assembly, existing front face assemblies require a large space for housing the lighting device in the front face assembly.

A second drawback of existing front face assemblies comprising a lighting device is that the lighting device is secured to the shut-off element, limiting the flexibility of movement of the lighting device within the front face assembly.

The present invention falls within this context, proposing a front face lighting assembly intended to be fitted in a vehicle, the front face lighting assembly comprising a screen which has at least one passage via which an air flow can pass through the screen, a shut-off device configured to control circulation of the air flow through the passage, the shut-off device comprising at least one flap adapted to take up a first position in which the flap shuts off the passage and a second position in which the flap opens the passage, the front face lighting assembly comprising a lever which controls at least the positions of the flap, said front face lighting assembly comprising at least one lighting device borne by the lever and distinct from the flap.

The shut-off element extends in the passage of the screen such that the air flow cannot enter via said passage. Sealing of the front face lighting assembly is thus improved.

Note that when the flap is in its first position, it is configured such that at least part of the whole space, advantageously all of the space, defined by the passage is blocked by the shut-off element.

Moreover, the lighting device of the front face lighting assembly is, like the flap, secured, via one end, to the lever, the lighting device and the flap, although secured to the same element, in this case the lever, are two clearly distinct elements of the front face lighting assembly. Note that the lighting device is not connected to the flap and more specifically when this flap moves. In other words, the lighting device does not have to go with the flap as it moves in order to change from one position to the other.

According to one feature of the invention, the lighting device is adapted to take up a first configuration in which the lighting device is moved away from the passage and a second configuration in which the lighting device is facing the passage. Note that the lighting device is adapted to emit a light beam which passes through the screen when the device is facing the passage.

According to one feature of the invention, the lighting device is in its first configuration when the flap is in its first position, the lighting device being in its second configuration when the flap is in its second position. Thus, the lighting device is facing the passage when the flap does not shut off the passage. As a result, the light beam emitted by the lighting device can be seen through the screen.

According to one feature of the invention, the lever is movable in translation in such a way as to cause the lighting device to go from one of its configurations to the other. This translational movement of the lever causes a translational movement of the lighting device allowing the lighting device to go from one of its configurations to the other.

According to one feature of the invention, the screen is provided with at least one guide means which carries the lever in its translational movement.

According to one feature of the invention, the front face assembly comprises a retention element having at least one groove inside which at least one lighting device travels. This groove advantageously makes it possible to guide the lighting device from one of its configurations to the other during the translational movement of the lever.

According to one feature of the invention, the lighting device and the flap extend in a vertical direction between a first end and a second end, the lever being arranged at the first end while the retention element is arranged at the second end.

According to one feature of the invention, the front face lighting assembly comprises a plurality of lighting devices arranged in series along the lever.

According to one feature of the invention, the lighting device is electrically connected to a control device by electrical connection means extending along the lever.

According to one feature of the invention, the lighting devices are controlled independently of one another by the control device.

According to one feature of the invention, the flap comprises a rotation shaft borne at least by the screen, the flap having a control pin engaged in the lever and via which the flap goes from one of its positions to the other.

According to one feature of the invention, the lighting device is in the form of a rigid strip light.

The invention also relates to a motor vehicle comprising a front face lighting assembly in accordance with any one of the above features.

Other features, details and advantages of the invention will become more clearly apparent from reading the following description and from exemplary embodiments provided by way of non-limiting indication with reference to the accompanying schematic drawings, in which:

FIG. 1 is an end-on view of a front face lighting assembly intended to be fitted in a vehicle, and in accordance with the invention;

FIG. 2 shows a screen of the front face lighting assembly visible in FIG. 1, isolated from the other elements of the front face lighting assembly;

FIG. 3 shows a shut-off device of the front face lighting assembly visible in FIG. 1, isolated from the other elements of the front face lighting assembly;

FIG. 4 shows a rear view of the front face lighting assembly visible in FIG. 1;

FIG. 5 shows an enlargement of an actuation device intended for controlling at least one lighting device of the front face lighting assembly.

Firstly, it must be noted that although the figures disclose the invention in detail for the implementation thereof, they can of course be used to further define the invention if applicable. It should also be noted that these figures merely disclose exemplary embodiments of the invention.

The features, variants and different embodiments of the invention may be associated with one another, in various combinations, provided that they are not mutually incompatible or exclusive. It is in particular possible to imagine variants of the invention that comprise only a selection of the features described below, in isolation from the other features described, if this selection of features is sufficient to confer a technical advantage or to differentiate the invention from the prior art.

In the figures, elements that are common to multiple figures retain the same reference sign.

FIG. 1 depicts a front face lighting assembly 1 intended to be fitted in a vehicle, and more specifically a motor vehicle. The front face lighting assembly 1 is for example a front grille.

The front face lighting assembly 1 has a screen 2 in which is made at least one passage 3 via which an air flow can pass through the screen 2 so as to enter the engine compartment of the vehicle. As can be seen in FIG. 1, this passage 3 is obstructed by a shut-off device 4 which will be described in more detail with reference to FIGS. 3 and 4. The shut-off device 4 is controlled by a control unit, not shown, commanding an actuation device 5 which will be described in more detail with reference to FIG. 5.

FIG. 2 depicts more specifically the screen 2 of the front face lighting assembly 1. This screen 2 has a first face 21 delimiting the screen 2 and via which the air flow is able to enter the engine compartment of the vehicle when the front face lighting assembly 1 is fitted in said vehicle. Opposite the first face 21, the screen 2 is delimited by a second face 22, visible in FIG. 4. Moreover, the screen 2 comprises, in the embodiment shown, a plurality of passages 3, each passage 3 extending between the first face 21 and the second face 22 of the screen 2.

As can be seen in FIG. 2, the passages 3 are distributed in series 35 along the screen 2 in a longitudinal direction parallel to the axis L at equal distances from one another. Each of these series 35 of passages 3 extends in a vertical direction parallel to the axis V. Moreover, in the embodiment shown, each series 35 comprises six passages 3. It should be noted that, in an alternative embodiment, the series 35 may comprise a different number of passages 3. Furthermore, these series 35 may each comprise a different number of passages 3 from one series 35 to another.

The passages 3 advantageously have a regular hexagonal shape, the dimensions of the sides of which are similar from one passage 3 to another of the same series 35. Such a repetition of shapes makes it possible to arrange the passages 3 in a regular pattern, in other words alternating regularly, making it possible to homogenize the circulation of the air flow through the screen 2.

FIG. 3 depicts a flap 41 of the shut-off device 4. This flap 41 extends, like the series of passages 3, mainly in the vertical direction, parallel to the axis V. More specifically, the flap 41 extends in said vertical direction between a first end 48 and a second end 49. Note that a single flap 41 is shown in FIG. 3 but, in the embodiment illustrated, the shut-off device 4 comprises a plurality of flaps 41, and more particularly a number of flaps 41 equal to the number of series 35 of passages 3 in the screen 2.

It will be understood from the above that a flap 41 of the shut-off device 4 is advantageously configured to be complementary to a series 35 of passages 3. To this end, the flap 41 comprises at least one shut-off element 42. In the embodiment shown, each flap 41 comprises a plurality of shut-off elements 42. More specifically, each flap 41 comprises a number of shut-off elements 42 equal to the number of passages 3 of the series 35 with which the flap 41 is associated. In other words, the flap 41 comprises six shut-off elements 42, each shut-off element 42 being intended to shut off one of the six passages 3 of the associated series 35. Note that "associated" means that the flap 41 is directly intended to shut off the passages 3 of the series 35 with which the flap 41 is complementary.

The shut-off elements 42 are housed in the passages 3. Thus, the shut-off elements 42 have a shape complementary to the shape of the passages 3. These similar shapes between the shut-off element 42 and the passage 3 allow the shut-off element 42 to penetrate the passage 3. More specifically, the shut-off element 42 penetrates the passage 3 in such a way that a contact face 43 of the flap 41 comes into contact with the second face 22 of the screen 2. This second face 22 comprises a support portion, distinct from the passages 3, the contact face 43 of the flap 41 coming into contact with this support portion.

The shut-off elements 42 protrude from said contact face 43 of the flap 41 over a dimension equal to the distance separating the first face 21 and the second face 22 of the screen 2. Note that when the contact face 43 of the flap 41 comes into contact with the second face 22 of the screen 2, and more specifically with the support portion of the second face 22, the shut-off elements 42 are then flush with the first face 21 of the screen 2.

It should be noted that each shut-off element 42 has a free end or free face at a distance from the part of the shut-off element 42 which starts on the contact face 43. This free end of the shut-off element 42 extends in a plane of extension coincident with the plane of extension of the first face 21 of the screen 2 at the passage 3 associated with said shut-off element 42 when the shut-off element 42 shuts off the passage and the contact face 43 is in contact with the second face 22 of the screen 2.

Moreover, this flap 41 is adapted to take up a first position in which at least one of the series 35 of passages 3 is shut off by the flap 41, in other words circulation of the air flow through the screen 2 is prevented by the flap 41, and a second position in which the flap 41 opens the passage 3, in other words circulation of the air flow through the screen 2 is permitted by the flap 41. The flaps 41 are rotatable between their first position and their second position. In the first position of the flaps 41, the shut-off elements 42 extend at least partially in passages 3 that are distinct from one another. The shut-off elements 42 then being flush with the first face 21 of the screen 2, the contact face 43 comes into contact with the second face 22 of the screen 2 opposite the first face 21.

This change of position of the flap 41 is permitted by a rotation shaft 44 extending on a longitudinal edge of the flap 41 from one vertical end to the other. This rotation shaft 44 comprises at each end, rotation pins 441 which are housed in rotation bearings formed in the screen 2, in such a way as to allow the rotation of the flap 41 about an axis which passes through the rotation shaft 44.

The flap 41 further comprises a control pin 45 formed at at least one of the vertical ends of the flap 41. More specifically, this control pin 45 is formed on a tab 46 extending perpendicularly to the contact face 43. The control pin 45 is housed in a bearing of a control lever, as will be described in more detail with reference to FIGS. 4 and 5, the passage of the flap 41 from its first position to its second position, and vice versa, being caused by operation of the lever.

FIGS. 4 and 5 respectively show a rear view of the front face lighting assembly 1 and a view focused on the actuation device 5. More specifically, these FIGS. 4 and 5 clearly show a light emitting means 7 comprising, according to the invention, at least one lighting device 71.

Moreover, as can be seen in FIG. 4, the flaps 41 are in their first position in which the flaps 41 shut off the series 35 and the associated passages 3. More particularly, the second face 22 of the screen 2 can be seen in FIG. 4. As shown in this FIG. 4, the front face lighting assembly 1 comprises a plurality of flaps 41 distributed in the longitudinal direction of extension of the screen 2.

The flaps 41 are connected to a lever 6 movable in translation in the longitudinal direction. In the embodiment shown, the lever 6 is blocked in the vertical direction and in the transverse direction, parallel to the axis T, by guide means 61. These guide means 61 are secured to the screen 2 and prevent the lever 6 from moving in the transverse and vertical directions, while allowing the lever 6 to move in the longitudinal direction.

The lever 6 comprises a bearing 62 in which the control pin 45 is housed. The lever 6 is connected to the flaps 41 by means of the control pin 45 of each flap and the associated bearing 62. The translational movement of the lever 6 causes the control pin 45 of each flap 41 to move. More generally, it will be appreciated that the translational movement of the lever 6 makes the flaps 41 go from one of their positions to the other.

To allow translational movement of the lever 6, the actuation device 5 comprises a fork 51 configured to cause the lever 6 to move in translation. As can be seen in particular in FIG. 5, the fork 51 is engaged on an element of the lever 6 in such a way that a movement of the fork 51 causes the lever 6 to move in translation; the control pin 45 in engagement in the bearing 62 of the lever 6 accompanies the translational movement of the lever 6 by a rotation of the flap about the rotation shaft 44.

In the embodiment shown, the light emitting means 7 comprises a plurality of lighting devices 71 distinct from the flaps 41, and more particularly a number of lighting devices 71 equal to the number of flaps 41 and hence to the number of series 35. Note that the lighting devices 71 are arranged in series along the lever 6.

These lighting devices 71 extend, like the series 35 and the flaps 41, mainly in a vertical direction, and more particularly between the first end 48 and the second end 49. Each lighting device 71 is adapted to take up a first configuration in which the lighting device 71 is moved away from the passage 3, visible in FIG. 4, and a second configuration in which the lighting device 71 is facing the passage 3, in other words in the embodiment shown facing the series 35 of passages 3.

Like the flaps 41, the passage from one configuration to the other is commanded by the lever 6 and thus controlled by the actuation device 5. In the embodiment shown in FIGS. 4 and 5, the lighting devices 71 are in their first configuration when the flaps 41 are in their first position, and in their second configuration when the flaps 41 are in their second position.

To this end, each lighting device 71 is borne by the lever 6. More specifically, each lighting device 71 is borne via a vertical end of the lighting device 71 at the first end 48. The opposite end of the lighting devices 71, in other words the end of the lighting devices 71 at the second end 49, travels inside a groove 72 acting as a guide for the lighting devices 71. Note that each lighting device 71 travels in a separate groove 72.

In this embodiment as shown, the flaps 41 and the lighting devices 71 are secured to the lever 6. As a result, the translational movement of the lever 6 causes, concomitantly, the movement of the flaps 41 and of the lighting devices 71 such that the flaps 41 go from one of their positions to the other and the lighting devices 71 go from one of their configurations to the other.

Naturally, this passage from one configuration to the other of the lighting devices 71, by means of the translation of the lever 6, is performed such that the lighting devices 71 are in their first configuration when the flaps 41 are in their first position and in their second configuration when the flaps 41 are in their second position.

The grooves 72 are formed in a retention element 73 extending in the longitudinal direction perpendicularly to the vertical direction at an end of the lighting devices opposite the lever 6, in other words at the second end 49. This retention element 73 comprises a plurality of bearings 74 making it possible to keep, together with the screen 2, the rotation pins 441 in a fixed position so as to ensure the change of position of the flaps 41. It will be understood from the above that the lever 6 is arranged at the first end 48 of the flaps 41 and of the lighting devices 71, and that the retention element 73 is arranged at the second end 49 of the flaps 41 and of the lighting devices 71.

Moreover, the grooves 72 have a kidney shape allowing the lighting devices 71 to be at the same distance from the screen 2 when said lighting devices 71 are in their first configuration and in their second configuration.

Each of the vertical ends of the lighting devices 71, in other words at the first end 48 and at the second end 49, has a bulge 62 for keeping the lighting devices 71 secured to the lever 6 and to the retention element 73. More specifically, each lighting device 71 is, in the embodiment shown, housed in a hole formed in the lever 6, the bulge 62 making it possible to block at least partially the movement of the lighting device 71 in the hole. At the second end 49, each lighting device 71 is housed in a groove 72, and the lighting device 71 comprises another bulge 62, not visible in FIG. 4, at that end at least partially preventing movement of the lighting device 71 in the groove 72 in the vertical direction. Note that the interaction of the two bulges 62 of a lighting device 71 allows it to be kept secured to the lever 6 and to the retention element 73.

Moreover, in the embodiment shown, each lighting device 71 is in the form of a rigid strip light. These lighting devices 71 are electrically connected to a control device, not shown here, by electrical connection means 8 extending along the lever 6 and making it possible, on the one hand, to supply power to the lighting devices 71 and on the other hand, to transmit information linked to the operation of the lighting device 71. This information makes it possible in particular to selectively control each lighting device 71 and, for example, to modulate the colour of the light beam emitted by each lighting device 71.

The present invention clearly achieves the aim set by proposing a front face lighting assembly which is more compact and in which the lighting devices, which are distinct from the flaps, are able to move independently of the movement of the flap.

The invention claimed is:

1. A front face lighting assembly configured to be fitted in a vehicle,
    the front face lighting assembly comprising:
    a screen which comprises at least one passage via which an air flow is able to pass through the screen,
    a shut-off device configured to control circulation of the air flow through the passage,
        wherein the shut-off device comprises at least one flap adapted to take up a first position in which the flap shuts off the passage and a second position in which the flap opens the passage,
    a lever which controls at least the positions of the flap, and
    at least one lighting device borne by the lever and distinct from the flap.

2. The front face lighting assembly according to claim 1,
    wherein the flap comprises a rotation shaft borne at least by the screen,
    wherein the flap comprises a control pin engaged in the lever, wherein the flap goes from one of its positions to the other via the control pin.

3. The front face lighting assembly according to claim 1, wherein the lighting device is in the form of a rigid strip light.

4. A motor vehicle comprising a front face lighting assembly according to claim 1.

5. The front face lighting assembly according to claim 1, comprising a retention element,
    wherein the retention element comprises at least one groove, wherein at least one lighting device travels inside the groove.

6. Front The front face lighting assembly according to claim 5,
    wherein the lighting device and the flap extend in a vertical direction between a first end and a second end,
        wherein the lever is arranged at the first end while the retention element is arranged at the second end.

7. The front face lighting assembly according to claim 1, further comprising a plurality of lighting devices arranged in series along the lever.

8. The front face lighting assembly according to claim 7,
    wherein the lighting device is electrically connected to a control device by an electrical connection extending along the lever.

9. The front face lighting assembly according to claim 8, wherein the lighting devices are controlled independently of one another by the control device.

10. The front face lighting assembly according to claim 1,
    wherein the lighting device is adapted to take up a first configuration in which the lighting device is moved away from the passage, and
    wherein the lighting device is adapted to take up a second configuration in which the lighting device is facing the passage.

11. The front face lighting assembly according to claim 10,
    wherein the lighting device is in its first configuration when the flap is in its first position,
    wherein the lighting device is in its second configuration when the flap is in its second position.

12. The front face lighting assembly according to claim 10,
    wherein the lever is movable in translation in such a way as to cause the lighting device to go from one of its configurations to the other.

13. The front face lighting assembly according to claim 12,
    wherein the screen is provided with at least one guide which carries the lever in its translational movement.

* * * * *